(12) United States Patent
Kitaori

(10) Patent No.: US 8,175,778 B2
(45) Date of Patent: May 8, 2012

(54) CONTROL APPARATUS AND CONTROL METHOD FOR AUTOMATIC TRANSMISSION

(75) Inventor: Ichiro Kitaori, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 766 days.

(21) Appl. No.: 12/235,051

(22) Filed: Sep. 22, 2008

(65) Prior Publication Data

US 2009/0088935 A1 Apr. 2, 2009

(30) Foreign Application Priority Data

Sep. 28, 2007 (JP) ................................. 2007-254874

(51) Int. Cl.
*G06F 7/00* (2006.01)
*G06F 17/00* (2006.01)

(52) U.S. Cl. .............................. 701/52; 701/62; 477/132

(58) Field of Classification Search .................... 701/52, 701/62; 475/132; 477/34, 906, 907; 74/335
See application file for complete search history.

(56) References Cited

U.S. PATENT DOCUMENTS

| | | | | |
|---|---|---|---|---|
| 4,561,055 A * | 12/1985 | McKee | .............. | 701/52 |
| 4,635,508 A * | 1/1987 | Tatsumi | .............. | 477/125 |
| 4,833,945 A * | 5/1989 | Kondo | .............. | 477/133 |
| 4,958,287 A | 9/1990 | Sugimura et al. | | |
| 5,591,102 A * | 1/1997 | White et al. | .............. | 477/107 |
| 5,680,308 A | 10/1997 | Warren | | |
| 6,205,390 B1 * | 3/2001 | Holbrook et al. | .............. | 701/62 |
| 6,658,339 B1 | 12/2003 | Wright et al. | | |
| 6,698,302 B2 * | 3/2004 | Jager et al. | .............. | 74/335 |
| 7,572,203 B2 | 8/2009 | Kashiwagi et al. | | |
| 2002/0082132 A1 | 6/2002 | Jeon | | |
| 2004/0162661 A1 * | 8/2004 | Kikuchi | .............. | 701/62 |
| 2005/0022621 A1 * | 2/2005 | Kusano | .............. | 74/335 |
| 2005/0126322 A1 * | 6/2005 | Kozaki et al. | .............. | 74/335 |

FOREIGN PATENT DOCUMENTS

| | | |
|---|---|---|
| DE | 101 63 289 A1 | 10/2002 |
| DE | 696 22 628 T2 | 11/2002 |
| DE | 103 12 397 A1 | 11/2003 |
| DE | 601 05 327 T2 | 9/2005 |
| DE | 600 21 339 T2 | 4/2006 |
| JP | 8-6799 | 1/1996 |
| JP | 8-193652 | 7/1996 |
| JP | 11-180182 | 7/1999 |
| JP | 3017501 | 12/1999 |
| JP | 2006-336840 | 12/2006 |
| JP | 2007-298083 | 11/2007 |

\* cited by examiner

*Primary Examiner* — John Nguyen
*Assistant Examiner* — Brian J Broadhead
(74) *Attorney, Agent, or Firm* — Oblon, Spivak, McClelland, Maier & Neustadt, L.L.P.

(57) ABSTRACT

If a mode-detection value is switched from an automatic shift-mode to a manual shift-mode, a T-ECU changes a shift-stage to a speed lower than a speed that is obtained before the switching of the mode-detection value. The T-ECU determines that a state of the T-ECU returns to a recognizable-state, in which a mode-selection value can be recognized, from an unrecognizable-state, in which the mode-selection value cannot be recognized. The T-ECU sets the shift-stage to a hold value after the return. The T-ECU controls the shift-stage in the automatic shift-mode "D" over a standby-period after the return. The T-ECU controls the shift-stage in the automatic shift-mode "D" until the detection of the operation of the shift-lever after the standby-period passes.

14 Claims, 4 Drawing Sheets

CONTROL APPARATUS AND CONTROL METHOD FOR AUTOMATIC TRANSMISSION

BACKGROUND OF THE INVENTION

The present invention relates to a control apparatus for an automatic transmission. The control apparatus controls the shift-state of the automatic transmission on the basis of a selected shift-mode. When selection is switched from an automatic shift-mode to a manual shift-mode, the automatic shift-control apparatus changes the shift-stage or a shift-range to a speed that is lower than the current shift-stage. Further, the present invention relates to a method for controlling the automatic transmission.

FIG. 8 of Japanese Patent No. 3017501 discloses a down-shifting process. If the driver operates a shift-lever to change the shift-mode of an automatic transmission from an automatic shift-mode "D" to a manual shift-mode "M", the shift-stage of the automatic transmission is changed to low speed by one or two stages in the downshifting process. The downshifting process provides the driver with sporty drive feel.

If a power-supply voltage is reduced or load to be processed is excessively increased, the control apparatus for an automatic transmission some times initializes itself like when the power-supply has just been activated.

If the control apparatus initializes itself, data about shift-modes stored in a memory is lost in some cases. Suppose that, for example, the initialization occurs a shift-mode obtained before the initialization has been a manual shift-mode "M". When the data of the memory is lost due to the initialization, the data of the memory may temporarily be an automatic shift-mode "D". The control apparatus changes the data of the memory to the manual shift-mode "M" by detecting the state of the shift-lever after the initialization. Considering the data of the memory from a point of view of the control apparatus, the initialization of the control apparatus means that the driver has operated the shift-lever to change the shift-mode from the automatic shift-mode "D" to the manual shift-mode "M". Accordingly, when the initialization occurs, the control apparatus performs a downshifting process. In other words, there is a concern that an unintended downshifting process may be performed during the drive regardless of the driver's operation of the shift-lever.

The problem of the vehicle drivability can be caused by temporary loss of an output signal of a shift-lever sensor as well as the initialization of the control apparatus.

An objective of the present invention is to prevent the vehicle drivability from deteriorating.

According to one aspect of the present invention, there is provided a control apparatus for controlling a shift-stage of an automatic transmission. An upper limit of a control range of the shift-stage may be set by setting a shift-range. The automatic transmission is operated to select one of a plurality of shift-modes including an automatic shift-mode and a manual shift-mode. The automatic transmission includes a mode-operation detecting section. The mode-operation detecting section detects the selecting operation to obtain a mode-detection value. A power-supply voltage is supplied to the control apparatus. The control apparatus includes a shift-stage control section that controls the shift-stage on the basis of the mode-detection value. The shift-stage control section changes the shift-stage or the shift-range to speed lower than speed that is obtained before the switching of the mode-detection value if the mode-detection value is switched from the automatic shift-mode to the manual shift-mode. The shift-stage control section may be in a recognizable-state, in which the shift-stage control section is capable of recognizing the mode-selection value, or an unrecognizable-state, in which the shift-stage control section is not capable of recognizing the mode-selection value. A holding section holds a value of the shift-stage or the shift-range as a hold value. The holding section continues to hold the hold value regardless of the reduction of the power-supply voltage. A return determining section determines that the shift-stage control section returns to the recognizable-state from the unrecognizable-state. A return-time adjusting section sets the shift-stage to the hold value after the return of the shift-stage control section. The return-time adjusting section controls the shift-stage in the automatic shift-mode over a standby-period after the return. The return-time adjusting section controls the shift-stage in the automatic shift-mode until the selecting operation is detected after the standby-period passes.

Further, according to another aspect of the present invention, there is provided a control apparatus for an automatic transmission. A return-time adjusting section observes whether a mode-detection value is in the manual shift-mode over the standby-period after the return of a shift-stage control section. The return-time adjusting section sets a shift-stage or a shift-range to the hold value if determining that the mode-detection value is in the manual shift-mode. Until the standby-period passes, the return-time adjusting section then controls the shift-stage in the manual shift-mode until the detection of the selecting operation.

According to another aspect of the present invention, there is provided a control method of controlling a shift-stage of an automatic transmission. An upper limit of a control range of the shift-stage may be set by setting a shift-range. The automatic transmission is operated as to select one of a plurality of shift-modes including an automatic shift-mode and a manual shift-mode. The automatic transmission includes a mode-operation detecting section. The mode-operation detecting section detects the selecting operation to obtain a mode-detection value. A power-supply voltage is supplied to the automatic transmission. The control method includes controlling the shift-stage on the basis of the mode-detection value, and changing the shift-stage or the shift-range to a speed lower than a speed that is obtained before the switching of the mode-detection value, when the mode-detection value is switched from the automatic shift-mode to the manual shift-mode. Further, the control method includes holding a value of the shift-stage or the shift-range as a hold value and continuing to hold the hold value regardless of the reduction of the power-supply voltage, and determining that a state returns to a recognizable-state, in which a mode-selection value can be recognized, from an unrecognizable-state, in which the mode-selection value cannot be recognized. Furthermore, the control method includes setting the shift-stage to the hold value after the return, and controlling the shift-stage in the automatic shift-mode over a standby-period after the return. In addition, the control method includes controlling the shift-stage in the automatic shift-mode until the selecting operation is detected after the standby-period passes.

According to another aspect of the present invention, there is provided a control method of controlling a shift-stage of an automatic transmission. The control method includes observing whether a mode-detection value is in a manual shift-mode after return over a standby-period. Further, the control method includes setting a shift-stage or a shift-range to a hold value if it is determined that the mode-detection value is in the manual shift-mode during the standby-period. Furthermore, the control method includes controlling the shift-stage in the manual shift-mode until the detection of the selecting operation until the standby-period passes.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

Figure 1:
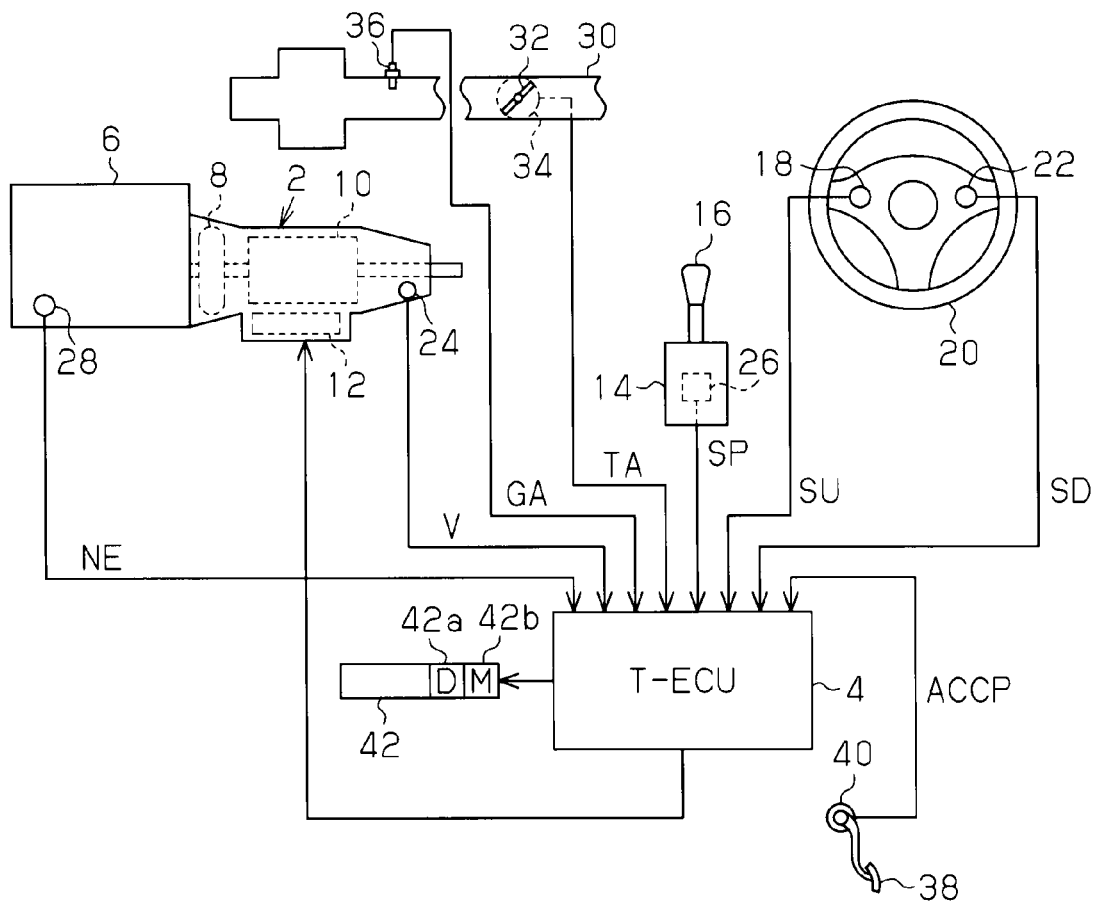
FIG. 1 is a block diagram of an automatic transmission and a T-ECU according to a first embodiment of the present invention.

FIGS. 1 to 4 show a first embodiment of the present invention. FIG. 1 is a block diagram of a vehicle having a T-ECU 4 according to the first embodiment. The vehicle includes an automatic transmission 2, the T-ECU 4, an engine 6, a drive system, a shift device 14, a steering wheel 20, an intake pipe 30, and an accelerator pedal 38. The T-ECU 4 is an automatic shift-control apparatus, which functions as a control apparatus for controlling a shift-stage of the automatic transmission 2. The engine 6 is a gasoline engine, which is an internal combustion engine. An output of the engine 6 is input to the automatic transmission 2 through a torque converter 8. The automatic transmission 2 changes the output speed of the engine 6, and outputs the changed output to the drive system of the vehicle. A power-supply voltage is supplied to the automatic transmission 2 and the T-ECU 4 from a vehicle battery.

The automatic transmission 2 includes a transmission gear mechanism 10 and a hydraulic control section 12. The transmission gear mechanism 10 includes a planetary gear type gear train, a hydraulic clutch, and a hydraulic brake. The hydraulic clutch and the hydraulic brake constitute a plurality of frictional engagement elements of the transmission gear mechanism 10. The operational states of the frictional engagement elements are switched, so that the state of the operational connection of the gear train is switched to any one of a parking-state (P-state), a reverse-state (R-state), a neutral-state (N-state), and an advancing-state. The shift-stage of the advancing-state is selected as one of five speeds, that is, a first-speed, a second-speed, a third-speed, a fourth-speed, and a fifth-speed. The speed is reduced from the fifth-speed toward the first-speed.

The hydraulic control section 12 includes a plurality of electromagnetic solenoids. When a control signal is input from the outside, each electromagnetic solenoid is operated. When the operational state of each electromagnetic solenoid is switched, the operational states of the hydraulic clutch and the hydraulic brake are switched. The hydraulic control section 12 switches the operational state of the transmission gear mechanism 10 to any one of the parking-state, the reverse-state, the neutral-state, and the advancing-state on the basis of the control signal.

The driver operates the shift device 14 to select one shift-mode from a shift-mode group. In other words, the automatic transmission 2 is selectively operated so that one mode is selected from a plurality of shift-modes including an automatic shift-mode "D" and a manual shift-mode "M". The shift device 14 includes a shift-lever 16 serving as an operation section to be operated by the driver. By operating the shift-lever 16, one is selected from the parking-state, the reverse-state, the neutral-state, and the advancing-state as the operational state of the automatic transmission 2.

Figure 2:
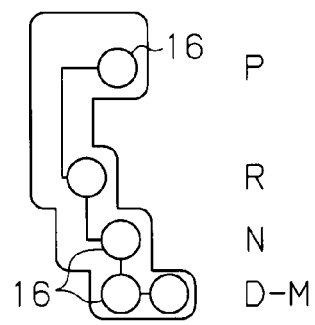
FIG. 2 is a plan view of a shift gate that is included in the automatic transmission of FIG. 1.

As shown in FIG. 2, the shift device 14 includes a shift gate that has five shift-positions. The five shift-positions include a P-position (parking-position), an R-position (reverse-position), an N-position (neutral-position), a D-position (drive range-position), and an M-position (manual range-position). The driver selects a mode-selection value SP as a selected shift-position by positioning the shift-lever 16 to any one of the five shift-positions.

The steering wheel 20 includes an upshift switch 18 at a left portion thereof, and a downshift switch 22 at a right portion thereof. The driver can operate the upshift switch 18 and the downshift switch 22 while steering the steering wheel 20. If the shift-lever 16 is in the M-position, the driver can perform an upshift operation by purposely operating the upshift switch 18 and can perform a downshifting operation by operating the downshift switch 22. For example, if the upshift switch 18 is operated just one time, the T-ECU 4 switches the shift-stage of the automatic transmission 2 to a stage that is one stage higher than the current shift-stage. Further, if the downshift switch 22 is operated just one time, the T-ECU 4 switches the shift-stage of the automatic transmission 2 to a stage that is one stage lower than the current shift-stage.

The automatic transmission 2 includes a vehicle speed sensor 24 that detects a vehicle speed V. The shift device 14 includes a shift-position sensor 26 serving as a mode-operation detecting section for detecting the mode-selection value SP. The shift-position sensor 26 includes a detection signal output circuit for detecting the state of the shift-mode group that is selected by the shift-lever 16. The shift-position sensor 26 is a mode-operation detecting section that detects the selecting operation of the shift-lever 16 performed by the driver and obtains a mode-detection value. The mode-detection value includes the mode-selection value SP. The engine 6 includes an engine speed sensor 28 that detects an engine speed NE. The intake pipe 30 is used to supply air to a combustion chamber of the engine 6. A throttle valve 32 is provided on the intake pipe 30. A throttle opening sensor 34, which detects a throttle opening degree TA, is provided in the throttle valve 32. An air intake sensor 36, which detects the amount GA of intake air of the intake pipe 30, is provided on the intake pipe 30 at an upstream portion of the throttle valve 32. An accelerator pedal position sensor 40, which detects an accelerator pedal depression degree ACCP, is provided on the accelerator pedal 38.

Detection signals are input to the T-ECU 4 from the upshift switch 18, the downshift switch 22, the vehicle speed sensor 24, the shift-position sensor 26, the throttle opening sensor 34, the air intake sensor 36, and the accelerator pedal position sensor 40. The T-ECU 4 outputs a control signal to the hydraulic control section 12 of the automatic transmission 2, and switches the operational state of the transmission gear mechanism 10. For example, if the mode-selection value SP is in the P-position, the T-ECU 4 switches the state of the transmission gear mechanism 10 to the parking-state. If the mode-selection value SP is in the R-position, the T-ECU 4 switches the state of the transmission gear mechanism 10 to the reverse-state. If the mode-selection value SP is in the N-position, the T-ECU 4 switches the state of the transmission gear mechanism 10 to the neutral-state.

If the mode-selection value SP is in the D-position, the T-ECU 4 functions in the automatic shift-mode "D". In other words, the T-ECU 4 constantly selects a shift-stage, where appropriate fuel efficiency and power are obtained according to the current driving state of the vehicle, from the shift-stages corresponding to the first to fifth-speeds. Then, the T-ECU 4 performs an automatic shift-control that switches the operational state of the transmission gear mechanism 10 to the state corresponding to the selected shift-stage. The driving state of the vehicle is decided depending on the engine load or the torque requested by the driver. The T-ECU 4, which performs the automatic shift-control, determines the driving state of the vehicle on the basis of the vehicle speed V and the throttle opening degree TA, and selects a shift-stage that corresponds to the current driving state of the vehicle.

If the mode-selection value SP is in the M-position, the T-ECU 4 functions in the manual shift-mode "M". In other words, the T-ECU 4 switches the current shift-stage to a stage that is one stage higher than the current shift-stage, on the basis of an upshift signal SU generated from the upshift switch 18. Alternatively, the T-ECU 4 switches the current shift-stage to a stage that is one stage lower than the current shift-stage, on the basis of a downshift signal SD generated from the downshift switch 22. In other words, whenever the upshift signal SU is generated, the T-ECU 4 raises the shift-stage one by one to the fifth-speed, that is, the fifth-speed used as the upper limit. Further, whenever the downshift signal SD is generated, the T-ECU 4 lowers the shift-stage one by one to the first-speed, that is, the first-speed used as the lower limit.

The control in which the shift-stage is switched one by one with the upshift signal SU and the downshift signal SD is a shift-stage holding type control. The shift-control of the T-ECU 4 is not limited to the shift-stage holding type control, and may be a range holding type control. Whenever the upshift signal SU or the downshift signal SD is generated, the T-ECU 4 of the shift-stage holding type changes the shift-range. The shift-range is selected from five ranges, that is, a fifth range, a fourth range, a third range, a second range, and an L range. Whenever the upshift signal SU is generated, the T-ECU 4 raises the range. Whenever the downshift signal SD is generated, the T-ECU 4 lowers the range.

If the fifth range is selected, the T-ECU 4 performs the automatic shift-control in the range of the first to fifth-speeds. If the fourth range is selected, the T-ECU 4 performs the automatic shift-control in the range of the first to fourth-speeds. If the third range is selected, the T-ECU 4 performs the automatic shift-control in the range of the first to third-speeds. If the second range is selected, the T-ECU 4 performs the automatic shift-control in the range of the first and second-speeds. If the L range is selected, the T-ECU 4 can be set to only the first-speed. In other words, the upper limit of the control range of the shift-stage can be set by setting the shift-range.

A shift-state display 42 is provided on a vehicle dashboard. The shift-state display 42 is connected to the T-ECU 4. The shift-state display 42 includes a D lamp 42*a* that is turned on according to the D-state, and an M lamp 42*b* that is turned on according to the M-state. The T-ECU 4 informs the driver of the current shift-state by turning on/off the D lamp 42*a* or the M lamp 42*b*.

The T-ECU 4 stores the current shift-stage in a memory, such as a flash memory or a backup RAM, as a hold value. In other words, the T-ECU 4 functions as a holding section for holding the value of the shift-stage or the shift-range, which is stored in the memory, as a hold value. The holding section continues to hold the hold value regardless of the reduction of the power-supply voltage. In other words, even though the power-supply voltage is reduced, the T-ECU 4 continues to hold shift-stage data that is stored before the reduction of the power-supply voltage of the T-ECU 4. Accordingly, even when the power of the T-ECU 4 is cut off or the power-supply voltage is reduced to be lower than the minimum operating voltage of the T-ECU 4, the T-ECU 4 stores the immediately preceding shift-stage. The value of the shift-stage, which is obtained immediately before the power of the T-ECU 4 is cut off or the power-supply voltage is reduced, is a hold value. In other words, when restarting from the power of the T-ECU 4 has been cut off or the power-supply voltage has been reduced, the T-ECU 4 can read out the hold value from the memory.

Figure 3:
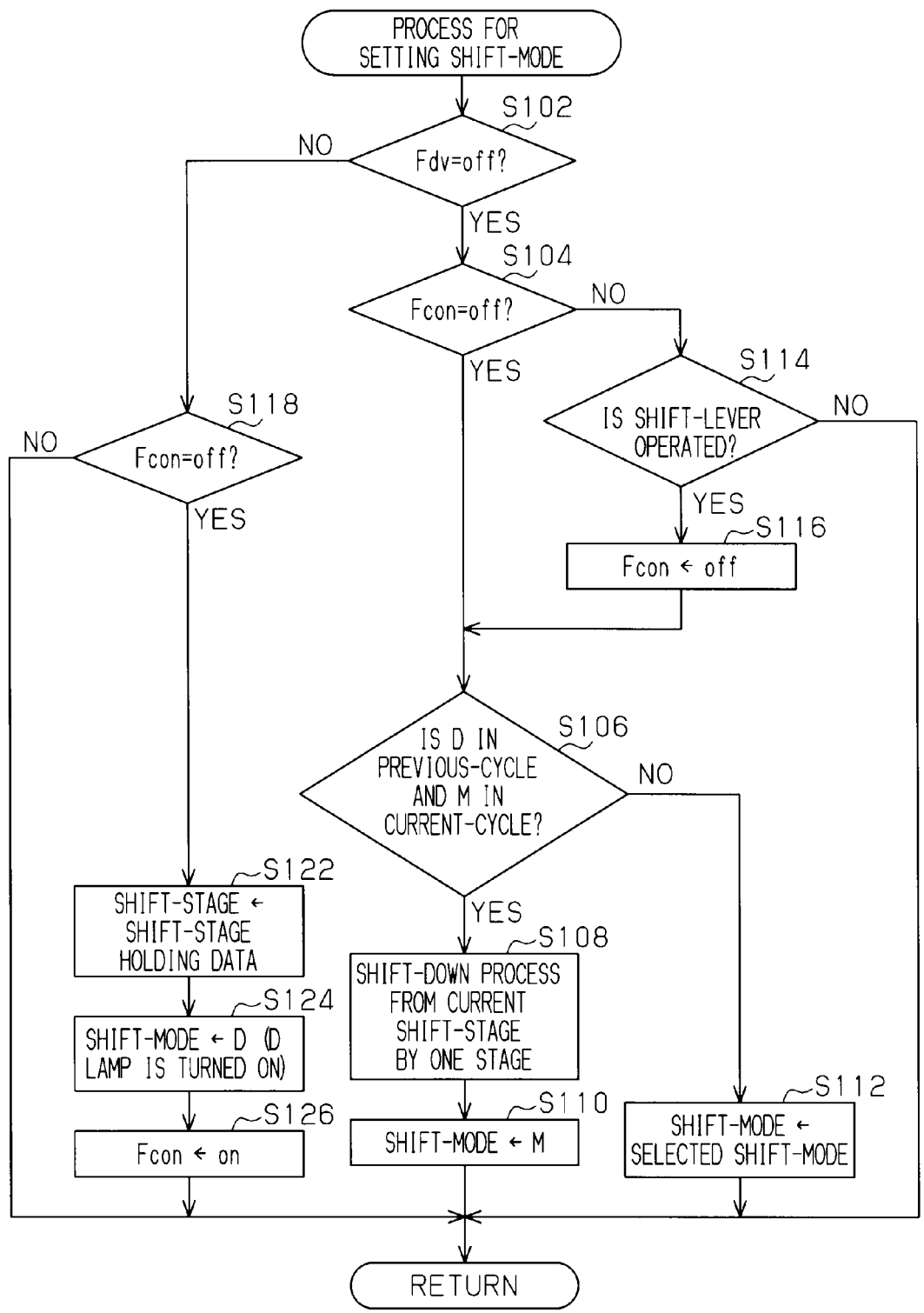
FIG. 3 is a flowchart illustrating a process for setting a shift-mode that is performed by the T-ECU of FIG. 1.

FIG. 3 is a flowchart illustrating a process for setting a shift-mode that is performed by the T-ECU 4. The process for setting the shift-mode is interrupted at intervals of an interruption period that is set in the range of, for example, 5 to 50 ms. The process for setting the shift-mode sets a shift-mode according to the contents of the operational state of the shift-lever 16 that is detected by the shift-position sensor 26.

As shown in FIG. 3, if the process for setting the shift-mode is performed, first, the T-ECU 4 determines whether a standby flag Fdv is turned off in step S102. The standby flag Fdv is set to ON immediately after the initialization, and is set to OFF when a standby-period Adv has passed. A process for setting the standby flag Fdv shown in FIG. 4 sets the standby flag Fdv to ON or OFF. The standby flag Fdv is a processing flag after the initialization. The standby-period Adv is a reference period. The process for setting the standby flag Fdv is a process for setting a processing flag after the initialization.

Figure 4:
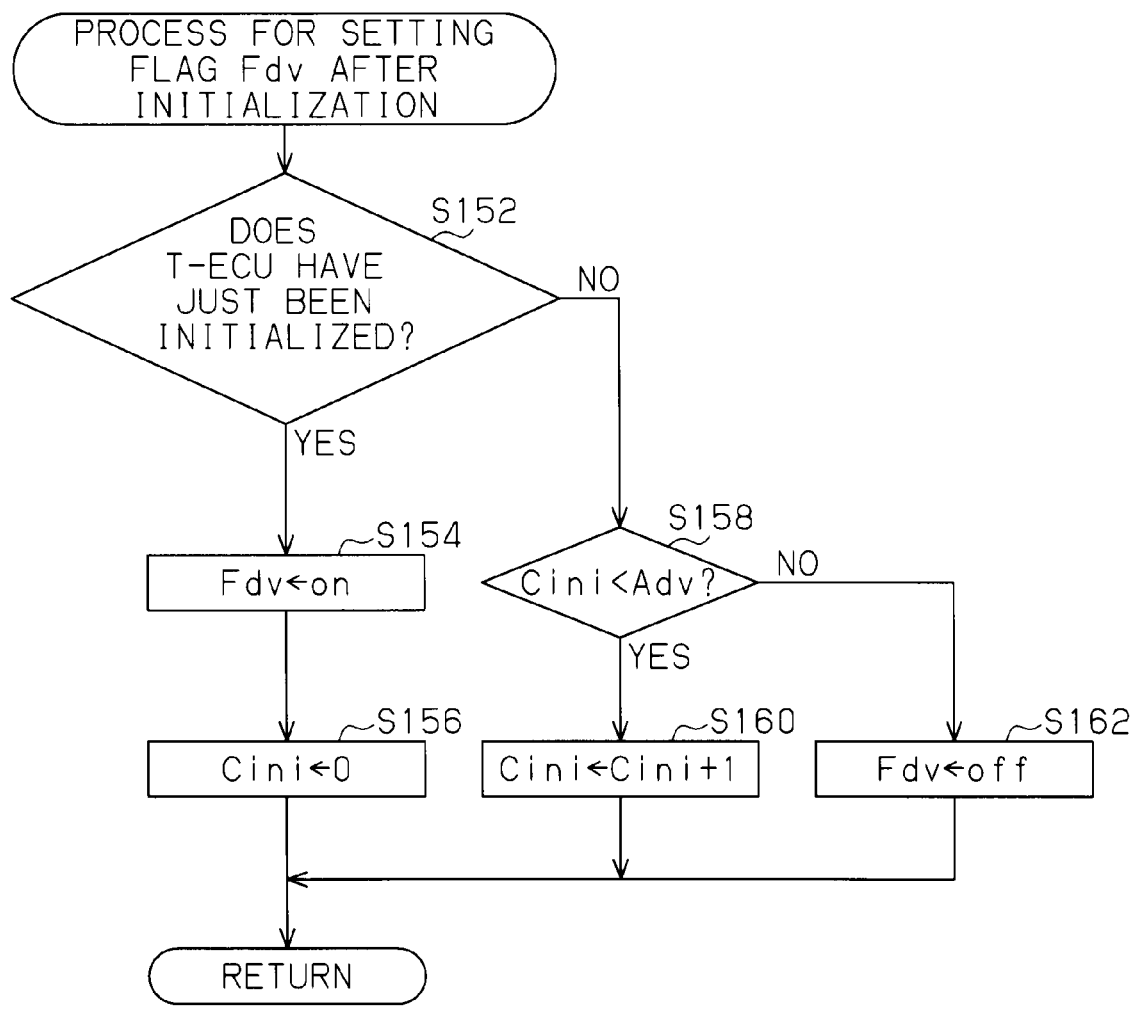
FIG. 4 is a flowchart illustrating a process for setting a standby flag Fdv that is performed by the T-ECU of FIG. 1.

The process for setting the standby flag Fdv of FIG. 4 is also interrupted at intervals of an interruption period, for example, 5 to 50 ms.

As shown in FIG. 4, first, the T-ECU 4 determines in step S152 whether the present time is the time immediately after the initialization. The T-ECU 4 has returns from the reduction of the power-supply voltage and started operating, overload is generated, or a working memory region is initialized by the command of the T-ECU 4. A case where the T-ECU 4 has returns from the reduction of the power-supply voltage and started operating includes a case where power-supply to the T-ECU 4 is activated. In other words, in step S152, the T-ECU 4 determines whether the present time is the time immediately after an initialization process is performed. In other words, the T-ECU 4 determines in step S152 whether a process to be performed at present is the first process after the initialization. In other words, the T-ECU 4 determines whether the present time is the first control-cycle after the initialization. If the T-ECU 4 determines that the present time is the time immediately after the initialization, that is, if YES is determined in step S152, the T-ECU 4 sets the standby flag Fdv to ON in step S154. In step S156, the T-ECU 4 clears a standby-counter Cini so that the standby-counter becomes "0" and temporarily terminates this process. The standby-counter Cini counts a standby-period until the initialized T-ECU 4 is raised so as to sufficiently recognize the signal generated from the shift-position sensor 26. The standby-counter Cini is a standby-counter after the initialization.

In step 512, NO is determined in the second control-cycle after the initialization. In this case, the T-ECU 4 determines in step S158 whether the standby-counter Cini is smaller than a preset standby-period Adv. The standby-period Adv is, for example, 1 to 2 seconds. The standby-period Adv is set to represent a period until the T-ECU 4 can sufficiently recognize the detection-state of the shift-position sensor 26 after the initialization of the T-ECU 4. In other words, when the standby-period Adv passes after the initialization, the T-ECU 4 can sufficiently recognize the detection-state of the shift-position sensor 26.

Initially, "Standby-counter Cini<Adv" is satisfied immediately after the initialization of the T-ECU 4. In other words, YES is determined in step S158. In this case, in step S160, the T-ECU 4 increments the standby-counter Cini and temporarily terminates this process.

As long as "standby-counter Cini<Adv" is satisfied, that is, as long as YES is determined in step S158, the T-ECU 4 continues to increment the standby-counter Cini in step S160.

When the standby-counter Cini=Adv, that is, if NO is determined in step S158, the T-ECU 4 sets the standby flag Fdv to off and temporarily terminates this process in step S162. In other words, until "standby-counter Cini=Adv" is satisfied immediately after the initialization of the T-ECU 4, the state where standby flag Fdv=on is continued.

After that, as long as the T-ECU 4 is not initialized again, the state where standby flag Fdv=off is continued. In other words, the T-ECU 4 determines NO in step S152, determines that NO in step S158 as well, and continues to set standby flag Fdv=off in step S162. In this way, whenever the T-ECU 4 is initialized, the T-ECU 4 repeatedly performs the process for setting the standby flag Fdv of FIG. 4.

Meanwhile, the process for setting the standby flag Fdv of FIG. 4 does not need to have all steps S152 to S162. For example, when the initialization process of the T-ECU 4 itself is set so that the T-ECU 4 performs processes such as step S154 and step S156, the process for setting the standby flag Fdv of FIG. 4 may include only steps S158, S160, and S162.

A further description to the description of the process for setting the shift-mode of FIG. 3 will now be presented. In FIG. 3, an automatic shift-flag Fcon is used as a drive range continuation flag. If standby flag Fdv=off in step S102, that is, if YES is determined in step S102, the T-ECU 4 determines in step S104 whether the automatic shift-flag Fcon is OFF. If the shift-lever 16 is in the D-position, the automatic shift-flag Fcon is set to ON. As long as the shift-lever 16 is not operated from the D-position to other positions, the automatic shift-flag Fcon, which is temporarily set to ON, continues to be in the ON state. When the shift-lever 16 is temporarily operated from the D-position to other positions, the automatic shift-flag Fcon, which has been set to ON, is set to OFF.

If "automatic shift-flag Fcon=off" is satisfied, that is, if YES is determined in step S104, the T-ECU 4 detects in step S106 whether the shift-position sensor 26 has detected the automatic shift-mode "D" in the previous control-cycle and detects the manual shift-mode "M" in the current control-cycle. The automatic shift-mode "D" indicates the drive range, and the manual shift-mode "M" indicates the manual range. If NO is determined in step S106, that is, if the shift-mode is not changed from the automatic shift-mode "D" into the manual shift-mode "M", the T-ECU 4 sets the shift-mode of the automatic transmission 2 to the shift-mode, which is detected by the shift-position sensor 26, in step S112.

In other words, if both standby flag Fdv=off and automatic shift-flag Fcon=off, and the shift-position sensor 26 does not detect the change of the shift-mode from the automatic shift-mode "D" to the manual shift-mode "M", the T-ECU 4 executes a shift-control so as to correspond to the position of the shift-lever 16 that is operated by the driver.

Meanwhile, if YES is determined in step S106, that is, if standby flag Fdv=off and automatic shift-flag Fcon=off are satisfied and the shift-position sensor 26 detects the change of the shift-mode from the automatic shift-mode "D" to the manual shift-mode "M", the T-ECU 4 performs a downshifting process in step S108. In other words, the T-ECU 4 makes the automatic transmission 2 shifts down by one stage from the current shift-stage. In other words, the shift-stage of the automatic transmission 2 is changed from the current shift-stage to low speed. The downshifting process has an effect of providing sporty drive feel that is expected by the driver. If the shift-control of the T-ECU 4 is a range holding type control, the T-ECU 4 makes the shift-range shift-down by one stage in step S108. If already corresponding to the first-speed or the L range at present, the shift-range cannot shift-down any more. Therefore, the T-ECU 4 maintains the current shift-range.

In step S110, the T-ECU 4 sets the shift-mode to the manual shift-mode "M" and temporarily terminates this process.

As described above, as long as the T-ECU 4 is not initialized again, the state where standby flag Fdv=off is continued. While the state where standby flag Fdv=off is continued, the T-ECU 4 continues to perform the above-mentioned process.

Next, a case where NO is determined in step S102 is described. In other words, a case where the T-ECU 4 has returns from the reduction of the power-supply voltage and thus started operating so as to execute initialization, a case where the T-ECU 4 is initialized after overload, or a case where the T-ECU 4 is initialized by its own command are described. The case where the T-ECU 4 returns from the reduction of the power-supply voltage includes a case where power-supply to the T-ECU 4 is activated. Even when NO is determined in step S102, the state where standby flag Fdv=on is continued by the process for setting the standby flag Fdv of FIG. 4 until the standby-period Adv passes immediately after the initialization of the T-ECU 4. Accordingly, the T-ECU 4 proceeds to step S118 from step S102.

In step S118, the T-ECU 4 determines whether the automatic shift-flag Fcon is OFF. Since the automatic shift-flag Fcon is set to OFF due to initial setting immediately after the initialization, YES is determined in step S118. In this case, in step S122, the T-ECU 4 reads out the hold value from the memory, and sets the current shift-stage to the hold value. Further, in step S124, the T-ECU 4 sets the shift-mode to the automatic shift-mode "D".

Accordingly, even though the shift-position sensor 26 detects the manual shift-mode "M" in the current control-cycle, the T-ECU 4 performs a shift-control of the automatic transmission 2 so that the shift-mode becomes the automatic shift-mode "D". If the D lamp 42a is turned on, the driver recognizes that the current shift-stage is in the automatic shift-mode "D".

In step S126, the T-ECU 4 sets the automatic shift-flag Fcon to ON and temporarily terminates this process.

Then, as long as the standby-period Adv has not passed, that is, as long as the state where standby flag Fdv=on and automatic shift-flag Fcon=on is continued, the T-ECU 4 temporarily terminates the process. In other words, as long as the standby-period Adv has not passed, NO is determined in step S102, NO is determined in step S118 as well, and the T-ECU 4 temporarily terminates the process while the shift-mode is the automatic shift-mode "D". In other words, as long as the standby-period Adv has not passed, the shift-stage, which is set in step S122 immediately after the standby flag Fdv is set to ON, and the shift-mode set in step S124, that is, the automatic shift-mode "D" are continued.

If the standby-period Adv passes, YES is determined in step S102 and standby flag Fdv=off is set. In step S104, the T-ECU 4 determines whether "automatic shift-flag Fcon=off" is satisfied. If the determination of step S104 is initially performed, NO is determined in step S104 because "automatic shift-flag Fcon=on" is satisfied. In this case, the T-ECU 4 determines in step S114 whether the shift-lever 16 has been operated.

If the driver does not operate the shift-lever 16, that is, if NO is determined in step S114, the T-ECU 4 terminates the process as it is. In other words, if the shift-lever 16 is not operated even after the standby-period Adv passes, the automatic shift-mode "D" set in step S124 is continued.

Meanwhile, after the standby-period Adv passes, that is, when YES is determined in step S102, YES is determined in step S114 if the shift-lever 16 is operated once. In this case, in step S116, the T-ECU 4 sets the automatic shift-flag Fcon to OFF. Accordingly, the T-ECU 4 performs steps S106 to S112, which are normal processes. In other words, if the shift-lever 16 is operated so as to select the manual shift-mode "M", that is, if YES is determined in step S106, the shift-mode is set to the manual shift-mode "M" in step S110. After that, until power-supply voltage is reduced, standby flag Fdv=off and automatic shift-flag Fcon=off are satisfied even in a subsequent control-cycle. In other words, YES is determined in step S102 and YES is determined in step S104. Accordingly, the T-ECU 4 performs steps S106 to S112 that are normal processes.

The shift-position sensor 26 corresponds to a selected state detecting section, which functions as a mode-operation detecting section of claims. The T-ECU 4 corresponds to a holding section, a return determining section, and a return-time adjusting section. A process where the memory of the T-ECU 4 holds the hold value corresponds to a function of the holding section, which functions as a state holding section. Steps S152 and S158 of the process for setting the standby flag Fdv of FIG. 4 correspond to the functions of the return determining section. Steps S154 to S162 of FIG. 4 and steps S102, S104, and S114 to S126 of the process for setting the shift-mode of FIG. 3 correspond to the functions of the return-time adjusting section. Steps S106 to S112 of FIG. 3 correspond to the functions of a shift-stage control section.

The first embodiment has the following advantages.

(1) In step S152 of the process for setting the standby flag Fdv of FIG. 4, the T-ECU 4 determines whether the present time is the time immediately after the initialization of the T-ECU 4. If the present time is the time immediately after the initialization of the T-ECU 4, the T-ECU 4 maintains the state where standby flag Fdv=on in steps S158 and S160 until the standby-period Adv passes. If the standby-period Adv passes in step S158, the T-ECU 4 determines that a state of the T-ECU 4 has returns from the unrecognizable state, in which the detection signal of the shift-position sensor 26 cannot be recognized, to the recognizable state, in which the detection signal of the shift-position sensor 26 can be recognized.

If standby flag Fdv=on, first, the T-ECU 4 sets the shift-stage of the automatic transmission 2 to a shift-stage hold value in step S122 of the process for setting the shift-mode of FIG. 3. Accordingly, the shift-stage of the automatic transmission 2 returns to a value that is obtained before the initialization.

Further, in step S124, the T-ECU 4 forcibly sets the shift-mode to the automatic shift-mode "D". In other words, even though the shift-lever 16 is positioned at the manual shift-mode "M" during the standby-period Adv, the T-ECU 4 forcibly sets the shift-mode of the automatic transmission 2 to the automatic shift-mode "D". In addition, even though the shift-lever 16 is positioned at the "M"-position until the shift-lever 16 is operated even after the standby-period Adv passes, the T-ECU 4 continues to set the shift-mode of the automatic transmission 2 to the automatic shift-mode "D". If the shift-lever 16 is operated after the standby-period Adv passes, the T-ECU 4 switches the automatic shift-flag Fcon from ON to OFF. After that, when the shift-lever 16 is operated to the manual shift-mode "M", in step S108, the T-ECU 4 makes the shift-stage shift-down by one stage and switches the shift-mode from the automatic shift-mode "D" to the manual shift-mode "M".

Accordingly, even though the T-ECU 4 is suddenly initialized during the driving in the manual shift-mode "M", the T-ECU 4 maintains the shift-stage or the shift-range, which are obtained before the initialization, until the shift-lever 16 is operated after the standby-period Adv passes. In other words, if the shift-lever 16 is not operated after the initialization, the T-ECU 4 does not change the shift-stage or the shift-range to the speed lower than the speed that is obtained before the initialization. Accordingly, a downshifting process, which is not intended by the driver, is prevented. In other words, vehicle drivability hardly deteriorates.

The sudden initialization of the T-ECU 4 includes the following cases. In other words, there are a case where the power-supply voltage of the T-ECU 4 is reduced and the power-supply voltage returns to an original voltage, a case where overload of the T-ECU 4 is generated, and a case where the T-ECU 4 is initialized by own command. The case where the T-ECU carries out a voltage return from the reduction of the power-supply voltage includes a case where power-supply to the T-ECU 4 is activated. Accordingly, the T-ECU 4 can accurately grasp a situation where a downshifting process not intended by the driver may be performed, and can prevent vehicle drivability from deteriorating.

In other words, the T-ECU 4 includes a shift-stage control section, a holding section, a return determining section, and a return-time adjusting section. The shift-stage control section has step S112 of controlling the shift-stage on the basis of the mode-detection value. The shift-stage control section has steps S106 and S108 of changing the shift-stage or the shift-range to the speed lower than the speed obtained before the mode-detection value is switched when the mode-detection value is switched from the automatic shift-mode "D" to the manual shift-mode "M". The shift-stage control section may be in the unrecognizable state, in which the shift-stage control section is not capable of recognizing the mode-selection value, or in the recognizable state, in which the shift-stage control section is capable of recognizing the mode-selection value. The holding section is the memory of the T-ECU 4. The return determining section has steps S102 and S158 of determining that the shift-stage control section returns to the recognizable-state from the unrecognizable-state. The return-time adjusting section has step S122 of setting the shift-stage to the hold value after the return of the shift-stage control section. The return-time adjusting section has step S124 of controlling the shift-stage in the automatic shift-mode "D" over the standby-period Adv after the return. The return-time adjusting section has step S114 of controlling the shift-stage in the automatic shift-mode "D" until the selecting operation is detected after the standby-period Adv passes.

Accordingly, even when an electronic-control circuit of the T-ECU 4 is initialized, or even when the detection signal output circuit of the shift-position sensor 26 recovers from abnormality, the shift-stage returns to the hold value that is obtained before the initialization or before the occurrence of the abnormality. Further, the shift-control is performed according to the automatic shift-mode "D" during the standby-period Adv that is obtained after the return. As long as the selecting operation is not performed on the shift-mode group after the standby-period Adv passes, the automatic shift-mode "D" is continued.

Accordingly, even after the initialization of the T-ECU 4, it is not determined that the selection is switched from the automatic shift-mode "D" to the manual shift-mode "M". In other words, a shift-control, which changes the shift-stage or the shift-range to the speed lower than the current speed, is not executed even after the initialization of the T-ECU 4. Therefore, even though the T-ECU is initialized when the driver does not operate the shift-lever 16, the vehicle drivability does not deteriorate.

Figure 5:
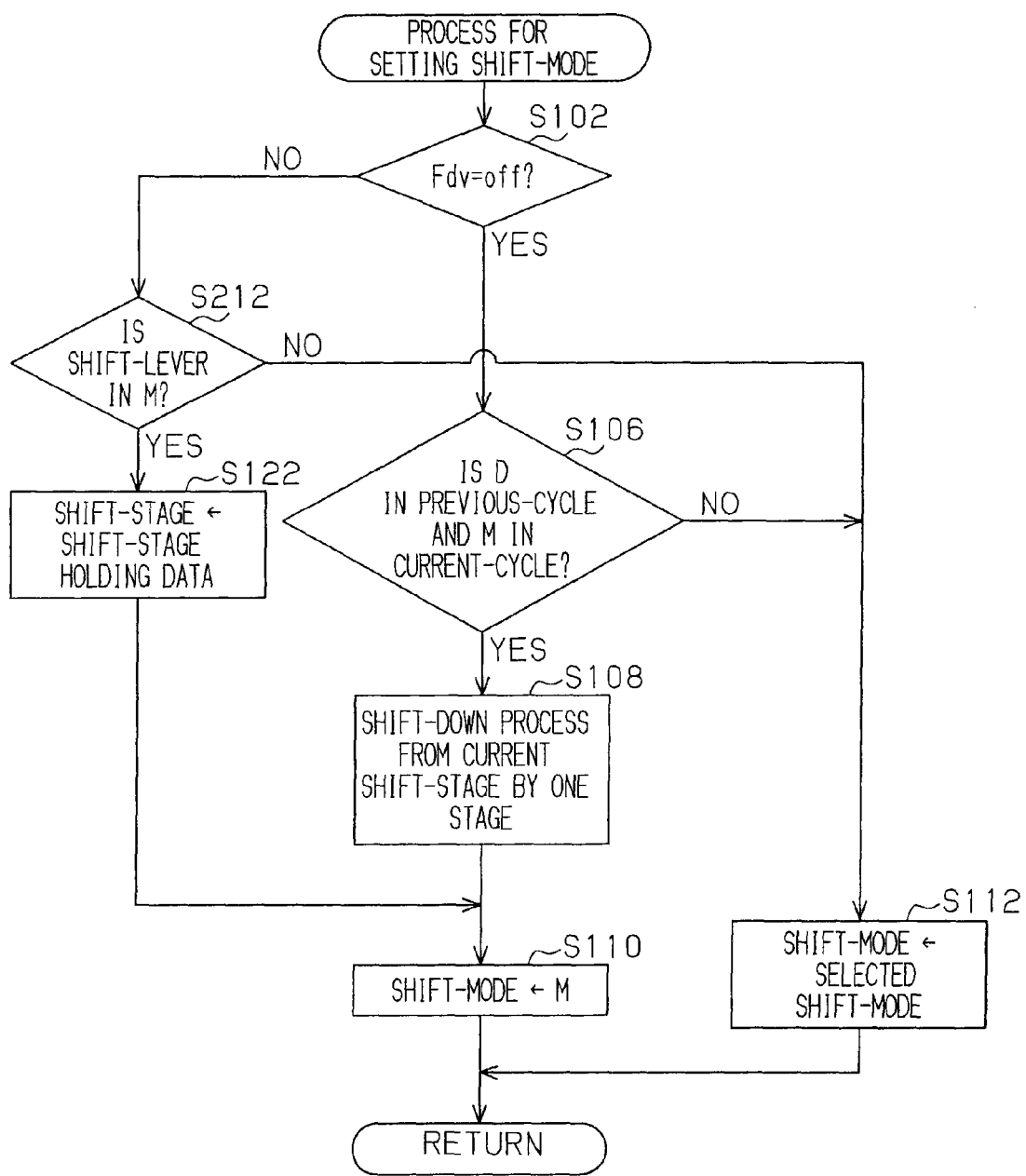
FIG. 5 is a flowchart illustrating a process for setting a shift-mode according to a second embodiment of the present invention.

FIG. 5 illustrates a process for setting a shift-mode according to a second embodiment. The automatic shift-flag Fcon is not used in FIG. 5 unlike FIG. 3. The configuration of the second embodiment is the same as that of the first embodiment except for FIG. 5.

As shown in FIG. 5, if a standby flag Fdv is OFF in step S102, the process directly proceeds to step S106. If a detection value of the shift-position sensor 26 is the automatic shift-mode "D" in the previous control-cycle and the manual shift-mode "M" in the current control-cycle, the T-ECU 4 proceeds to step S108 to perform a downshifting process and switches the shift-mode from the automatic shift-mode "D" to the manual shift-mode "M" in step S110. If NO is determined in step S106, the T-ECU 4 proceeds to step S112 and sets the shift-mode of the automatic transmission 2 so that the shift-mode becomes the shift-mode detected by the shift-position sensor 26.

In other words, if standby flag Fdv=off, the T-ECU 4 executes a shift-control so as to correspond to the position of the shift-lever 16 operated by the driver.

Meanwhile, if the present time is within the standby-period Adv (0≦Cini<Adv), that is, if standby flag Fdv=off, NO is determined in step S102 and the T-ECU 4 proceeds to step S212. In step S212, the T-ECU 4 determines whether the shift-lever 16 is in the M-position at the present time, on the basis of the detection value of the shift-position sensor 26. If the shift-position sensor 26 can recognize the position of the shift-lever 16 during the standby-period Adv, the T-ECU 4 can determine using the detection value of the shift-position sensor 26.

If NO is determined in step S212, that is, if the shift-lever 16 is not in the M-position before the standby-period Adv passes, the T-ECU 4 proceeds to step S112 and sets the shift-mode of the automatic transmission 2 so that the shift-mode becomes the shift-mode indicated by the shift-position sensor 26. In other words, as long as the T-ECU 4 is not initialized, the T-ECU 4 sets the shift-mode so as to correspond to the position of the shift-lever 16 selected by the driver.

If YES is determined in S212, that is, if the shift-lever 16 is in the M-position before the standby-period Adv passes, the T-ECU 4 proceeds to step S122 and sets the shift-stage of the automatic transmission 2 to the hold value. Further, in step S110, the T-ECU 4 sets the shift-mode to the manual shift-mode "M" and temporarily terminates the process. In other words, if the shift-lever 16 is in the M-position from the beginning when standby flag Fdv=on, the T-ECU 4 sets the shift-mode to the manual shift-mode "M" without performing a downshifting process. Further, even if the previous detection value of the shift-position sensor 26 is in the automatic shift-mode "D" and the current detection value is in the manual shift-mode "M" during the standby-period Adv, the T-ECU 4 does not perform a downshifting process.

After the standby-period Adv passes, steps S106 to S112, which are normal processes, are performed.

Steps S154 to S162 of FIG. 4 and steps S102, S110, S122, and S212 of FIG. 5 correspond to the functions of the return-time adjusting section of the second embodiment.

The second embodiment has the following advantages.

(2) If YES is determined in step S212, that is, if the T-ECU 4 can recognize that the shift-position sensor 26 detects the manual shift-mode "M " during the standby-period Adv, in step S110, the T-ECU 4 sets the shift-mode to the manual shift-mode "M" without performing a downshifting process. Accordingly, when the T-ECU 4 is initialized, the driver does not feel a sudden downshifting process. Therefore, the vehicle drivability hardly deteriorates.

In other words, the return-time adjusting section of the second embodiment has step S212 of observing whether a mode-detection value is in the manual shift-mode "M" over the standby-period Adv after the return of the shift-stage control section. The return-time adjusting section has step S122 of setting the shift-stage or the shift-range to the hold value if determining that the mode-detection value is in the manual shift-mode "M". Further, until the standby-period Adv passes, the return-time adjusting section has step S122 of controlling the shift-stage in the manual shift-mode "M" until the selecting operation is detected.

In other words, if the shift-lever 16 indicates the manual shift-mode "M" after the initialization of the T-ECU 4, the shift-stage returns to the hold value obtained before the initialization of the T-ECU 4. If the automatic transmission 2 is not a shift-stage holding type transmission but a range holding type transmission, the shift-range returns to a value obtained before the initialization of the T-ECU 4. Further, the return-time adjusting section sets the shift-control that is performed according to the manual shift-mode "M". In other words, a shift-control by the manual shift-mode "M" is performed without changing the shift-stage or the shift-range to the speed lower than the current speed.

Next, a third embodiment will be described. The third embodiment is different from the above-mentioned embodiment in terms of step S152 of the process for setting the standby flag Fdv of FIG. 4. Step S152 determines the logical sum of whether the T-ECU 4 has just been initialized, and whether the shift-position sensor 26 has recovered from abnormality and just begun to output a signal. In other words, if at least one of the case where initialization of the T-ECU 4 occurs, and the case where abnormality of the shift-position sensor 26 occurs, the standby-counter Cini begins to be counted in the third embodiment.

In other words, if the T-ECU 4 has just been initialized, YES is determined in step S152. Further, even if the shift-position sensor 26 has recovered from abnormality and just begun to output a signal, YES is determined in step S152.

The case where the shift-position sensor 26 has recovered from abnormality and just begun to output a signal also includes, for example, the following cases: the shift-position sensor 26 includes a switch that comes in contact with the shift-lever 16 positioned at the M-position. A case where the output signal of the switch stops an output due to contact failure or voltage supply failure and the output of the signal rises after restoration means the case where the shift-position sensor 26 has recovered from abnormality and just begun to output a signal. In this case, the output of the signal from the shift-position sensor 26 shows the characteristic voltage rise. For example, if the shift-lever 16 is operated to the M-position when the shift-position sensor 26 is in a normal state, the output signal of the shift-position sensor 26 rapidly rises. However, if the state of the contact failure or the voltage supply failure of the shift-position sensor 26 has just been released, the output signal slowly rises. The T-ECU 4 can determine whether the shift-position sensor 26 has just recovered from abnormality, by detecting the output of a characteristic signal of the shift-position sensor 26. In other words, even when the shift-position sensor 26 has recovered from abnormality and just begun to output a signal, the T-ECU 4 determines that the state has returned to a recognizable-state where the T-ECU 4 can recognize the detection value of the shift-position sensor 26 from the unrecognizable-state.

The third embodiment further has the following advantages.

(3) When the shift-position sensor 26 has recovered from abnormality as well as when the T-ECU 4 itself has just been initialized, the standby-counter Cini begins to be counted. Accordingly, even after the shift-position sensor 26 has recovered from the abnormality, it is not determined that the selection is switched from the automatic shift-mode "D" to the manual shift-mode "M". In other words, a shift-control, which changes the shift-stage or the shift-range to the speed lower than the current speed, is not executed even after the shift-position sensor 26 has recovered from the abnormality. Accordingly, even after the shift-position sensor 26 has recovered from abnormality when the driver does not operate the shift-lever 16, it is possible to prevent the sudden downshift from occurring. The vehicle drivability does not deteriorate.

The above-mentioned embodiment may be modified as follows.

The automatic transmission 2 is not limited to a planetary gear type automatic transmission. The automatic transmission 2 has a manual mode, and a shift-control of the automatic transmission may be performed by the T-ECU 4. The automatic transmission 2 may be a continuously variable transmission (CVT) or a hybrid transmission.

The downshift process of step S108 of FIG. 3 and step S108 of FIG. 5 are not limited to a process that shifts down by one stage, and may shift-down by two or more stages.

What is claimed is:

1. An automatic shift-control apparatus that controls a shift-state of an automatic transmission based on a shift-mode selected from a shift-mode group including an automatic shift-mode and a manual shift-mode, wherein, when selection is switched from the automatic shift-mode to the manual shift-mode, the apparatus changes a shift-stage or a shift-range to a lower speed side, the control apparatus comprising:
   a state holding section that holds a state data of a current shift-stage regardless of reduction of a power-supply voltage;
   a selection state detecting section for detecting a selection state of the shift-mode group;
   a detection return determining section for determining that the selection state has returned from a first state in which the selection state detecting section cannot detect the shift-mode selection state to a second state in which such detection is possible; and
   a return-time adjusting section, wherein, during a standby-period after the detection return determining section determines the return, the return-time adjusting section sets a shift-state of the automatic transmission to the shift-stage or a shift-range that is held by the state holding section, and sets a shift-control by the automatic shift-mode, and wherein, after the standby-period, the return-time adjusting section continues the automatic shift-mode unless selecting operation is executed on the shift-mode group.

2. The automatic shift-control apparatus according to claim 1, wherein, immediately after an electronic control circuit, which executes an automatic shift-control, is initialized, the detection return determining section determines that the state has returned from a state in which the selection state detecting section cannot detect the selection state to a state in which such detection is possible.

3. The automatic shift-control apparatus according to claim 2, wherein the standby-period is set to correspond to a period from when the electronic control circuit is initialized until the detection state of the selection state detecting section can be recognized.

4. The automatic shift-control apparatus according to claim 2, wherein the initialization of the electronic control circuit is caused by a return from reduction of the power-supply voltage including an activation of the power-supply.

5. The automatic shift-control apparatus according to claim 2, wherein the initialization of the electronic control circuit is caused by an overload in the electronic control circuit.

6. The automatic shift-control apparatus according to claim 2, wherein the initialization of the electronic control circuit is caused by an own command of the electronic control circuit.

7. The automatic shift-control apparatus according to claim 1, wherein, immediately after a detection signal output circuit, which outputs a signal in relation to a selection state of the shift-mode group, has recovered from abnormality and has begun to output a signal, the detection return determining section determines that the state has returned from a state in which the selection state detecting section cannot detect the selection state to a state in which such detection is possible.

8. An automatic shift-control apparatus that controls a shift-state of an automatic transmission based on a shift-mode selected from a shift-mode group including an automatic shift-mode and a manual shift-mode, wherein, when selection is switched from the automatic shift-mode to the manual shift-mode, the apparatus changes a shift-stage or a shift-range to a lower speed side, the control apparatus comprising:
   a state holding section that holds a state data of a current shift-stage or a current shift range regardless of reduction of the power-supply voltage;
   a selection state detecting section for detecting a selection state of the shift-mode group;
   a detection return determining section for determining that the selection state has returned from a first state in which the selection state detecting section cannot detect the shift-mode selection state to a second state in which such detection is possible; and
   a return-time adjusting section, wherein, during a standby-period after the detection return determining section determines the return, the return-time adjusting section sets a shift-state of the automatic transmission to the shift-stage or the shift-range that is held by the state holding section, and then sets a shift-control by the manual shift-mode.

9. The automatic shift-control apparatus according to claim 8, wherein, immediately after an electronic control circuit, which executes the automatic shift-control, is initialized, the detection return determining section determines that the state has returned from a state in which the selection state detecting section cannot detect the selection state to a state in which such detection is possible.

10. The automatic shift-control apparatus according to claim 9, wherein the standby-period is set to correspond to a period from when the electronic control circuit is initialized until the detection state of the selection state detecting section can be recognized.

11. The automatic shift-control apparatus according to claim 9, wherein the initialization of the electronic control circuit is caused by a return from reduction of the power-supply voltage including an activation of the power-supply.

12. The automatic shift-control apparatus according to claim 9, wherein the initialization of the electronic control circuit is caused by an overload in the electronic control circuit.

13. The automatic shift-control apparatus according to claim 9, wherein the initialization of the electronic control circuit is caused by an own command of the electronic control circuit.

14. An automatic shift-control apparatus that selects an automatic shift-mode when a shift lever is at an automatic shift position corresponding to an automatic shift-mode, selects a manual shift-mode when the shift lever is at a manual shift position corresponding to a manual shift-mode, and changes a shift-stage or a shift-range to a lower speed side when the shift lever is changed from the automatic shift position to the manual shift position, the control apparatus comprising:

a selection state detecting section for detecting a shift-stage or shift-range that is selected at any given time, a state holding section that stores the shift-stage or shift range detected by the detecting section regardless of reduction of a power-supply voltage, and a controlling section that changes the shift-stage or shift-range of an automatic transmission based on the detection result of the selection state detecting section, wherein, when a phenomenon in which the power supply voltage is reduced or a phenomenon in which communication between the selection state detection section and the controlling section fails and recovery from such a phenomenon is achieved, the shift-stage of the automatic transmission is maintained at the shift-stage or shift range immediately before the occurrence of the phenomenon and the shift-mode of the automatic transmission is set at the automatic shift mode until a standby-period elapses from the recovery, and wherein, if the shift lever is manipulated during the standby-period, the shift-stage of the automatic transmission is not changed according to the manipulation.

* * * * *